(12) United States Patent
Anderson et al.

(10) Patent No.: US 8,915,061 B2
(45) Date of Patent: Dec. 23, 2014

(54) AIRCRAFT, PROPULSION SYSTEM, AND INLET WITH SUPERSONIC COMPRESSION

(75) Inventors: Jon Thomas Anderson, Santa Clarita, CA (US); John D. Klinge, Palmdale, CA (US); Kenneth J. Hajic, Ventura, CA (US); Zachary S. Davis, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1415 days.

(21) Appl. No.: 12/786,321

(22) Filed: May 24, 2010

(65) Prior Publication Data
US 2013/0199621 A1 Aug. 8, 2013

(51) Int. Cl.
*F02K 3/02* (2006.01)
*F02C 7/04* (2006.01)
*B64D 33/02* (2006.01)

(52) U.S. Cl.
CPC .............. *F02K 3/02* (2013.01); *B64D 2033/026* (2013.01); *Y02T 50/671* (2013.01); *F05D 2220/80* (2013.01); *B64D 33/02* (2013.01); *F02C 7/04* (2013.01)
USPC ......................................... 60/226.1; 137/15.1

(58) Field of Classification Search
USPC ............... 60/226.1, 767, 768; 137/15.1, 15.2; 244/53 B
See application file for complete search history.

(56) References Cited

U.S. PATENT DOCUMENTS

| | | | | |
|---|---|---|---|---|
| 2,579,049 A * | 12/1951 | Price | | 60/39.35 |
| 2,840,322 A * | 6/1958 | Griffith | | 244/15 |
| 2,970,431 A * | 2/1961 | Harshman | | 137/15.1 |
| 3,066,483 A * | 12/1962 | Stratford | | 138/46 |
| 3,176,462 A * | 4/1965 | Eckert | | 60/244 |
| 3,242,671 A * | 3/1966 | Moorehead | | 137/15.1 |
| 3,417,767 A * | 12/1968 | Young | | 137/15.2 |
| 3,765,179 A * | 10/1973 | Strang et al. | | 60/262 |
| 5,447,283 A * | 9/1995 | Tindell | | 244/207 |
| 7,429,018 B1 * | 9/2008 | Kechely | | 244/53 B |
| 2008/0271787 A1 | 11/2008 | Henne et al. | | |
| 2009/0107557 A1* | 4/2009 | Conners | | 137/15.1 |
| 2010/0043389 A1* | 2/2010 | Conners | | 60/204 |
| 2013/0062424 A1* | 3/2013 | Conners | | 239/1 |

* cited by examiner

*Primary Examiner* — Phutthiwat Wongwian
(74) *Attorney, Agent, or Firm* — McDermott Will & Emery LLP

(57) ABSTRACT

A propulsion system and an aircraft that includes the propulsion system are provided. The propulsion system includes an engine and a cowling that surrounds at least a portion of the engine. The propulsion system also includes an inlet. The inlet includes a compression surface that is upstream and external to the cowling. The compression surface can slow air flow from a supersonic speed to a subsonic speed before the air flow enters the cowling.

17 Claims, 3 Drawing Sheets

AIRCRAFT, PROPULSION SYSTEM, AND INLET WITH SUPERSONIC COMPRESSION

BACKGROUND

Supersonic aircraft are typically equipped with gas turbine engines to achieve supersonic speeds. Gas turbine engines include compressors that require subsonic flow in a range of about Mach 0.3 to 0.6 at the face of the engine. An inlet decelerates the incoming supersonic air flow to a speed compatible with the requirements of the gas turbine engine. In conventional propulsion systems, supersonic inlets include a compression surface and corresponding flow path that decelerates the supersonic flow using a strong normal shock. Downstream of the normal shock, subsonic flow is further decelerated using a diffuser to a speed corresponding with requirements of the gas turbine engine. This normal shock places a sharp pressure rise on the subsonic boundary layer which causes the boundary layer to thicken and separate. This phenomenon results in lower inlet performance and higher distortion to the engine.

Traditional inlet design methods have generally focused on improving propulsion system performance by maximizing total inlet pressure recovery and hence gross engine thrust. While high pressure recovery definitely provides certain gains, maximizing pressure recovery typically comes at the price of significant inlet drag and inlet complexity, characteristics that typically run counter to a robust and low cost-of-operation design. For example, attempts to increase pressure recovery include bleed air-based methods, which improve inlet pressure recovery through shock strength management and boundary layer removal. However, bleed air-based methods typically take a large portion of the intake flow to produce the desired results and suffer corresponding drag-related penalties once the bleed flow is eventually exhausted overboard. Additionally, extensive secondary systems are typically required, consisting of complex flow routing equipment. The stabilizing bleed system represents an additional loss in net thrust of the system, as it requires added pressure loss (or mechanical pumping) to induce the bleed flow.

BRIEF DESCRIPTION OF THE DRAWINGS

Embodiments disclosed herein may be better understood, and their numerous objects, features, and advantages made apparent to those skilled in the art by referencing the accompanying drawings. The use of the same reference symbols in different drawings indicates similar or identical items.

DETAILED DESCRIPTION OF THE DRAWINGS

Embodiments of systems, methods and apparatus are disclosed that overcome the need to include bleed air systems in supersonic aircraft by isentropically compressing the supersonic flow to a speed that is less than or equal to Mach 1 before the air flow enters a cowling around an engine. Compressing the air flow to a subsonic speed external to the cowling eliminates or greatly reduces the normal shock that disrupts the boundary layer and distorts the air flow to the engine. With the normal shock weakened to such an extent, the pressure rise is removed from the boundary layer, resulting in an inlet with less boundary layer distortion and higher performance. The higher compression shape can be defined by integrating a differential equation written to describe the characteristics of a typical compression system. The resulting integrated equation can then be extrapolated to compress the flow fully to Mach 1 or less.

The normal shock/boundary layer interaction problem is typically solved by bleeding the boundary layer out of the inlet flow prior to pressure rise produced by the normal shock. This inlet bleed system increases kinetic turbulence in the viscous boundary layer, but also allows this lower energy boundary layer flow to be removed from the control volume. The combined effects of which reduce the adverse pressure rise from the normal shock-boundary layer interaction. Inlet bleed results in added drag to the vehicle and in a larger heavier inlet. Both these effects represent performance losses to the propulsion system. Compressing to a terminal normal shock at a speed less than or equal to Mach 1 removes the problem and is a much better solution than the typical method of fixing the problem after it has been created.

Figure 1:
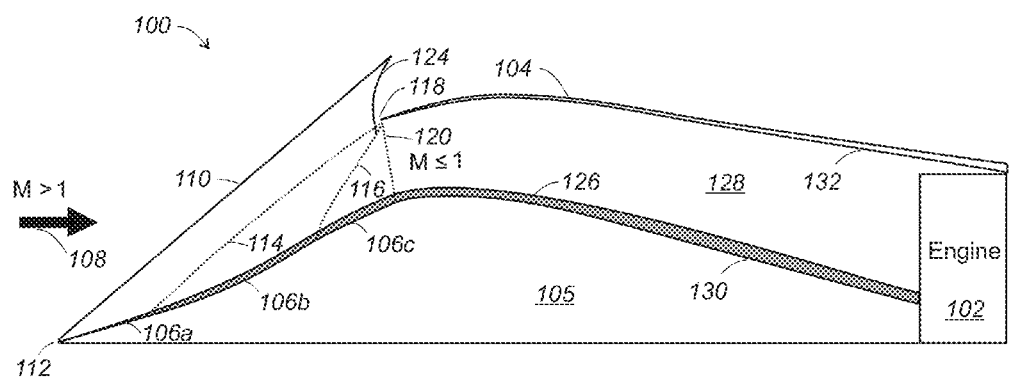
FIG. 1 shows a half-symmetry side view of an embodiment of an upstream portion of an inlet for a propulsion system in accordance with the present invention.

Referring to FIG. 1, a half-symmetry side view of an embodiment of an upstream portion of an inlet 100 for a propulsion system in accordance with the present invention is shown comprising an engine 102, a cowling 104 surrounding at least a portion of engine 102, and an inlet spike 105 with compression surface 106 upstream and external to the cowling 104. Supersonic air flow (Mach number (M)>1) is represented by arrow 108.

Compression surfaces 106a, 106b, 106c are collectively referred to herein as compression surface 106. Compression surface 106 can be configured with one or more different types of segments to slow air flow from supersonic speed to a Mach number less than or equal to ("≤") to 1 as the air flow enters the cowling 104. For example, the embodiment of compression surface 106 shown includes conical compression surface 106a upstream and adjacent to isentropic compression surface 106b, and conical surface 106c downstream and adjacent to isentropic compression surface 106b. Isentropic compression surface 106b generally represents a continuously curved surface that produces a continuum of infinitesimally weak waves during the compression process. As used herein, the term "wave" refers to a pressure discontinuity in the air flow. Conical compression surfaces 106a, 106c generally represent straight ramp or conic sections that produce discrete, oblique, or conic shocks.

Note that although the embodiment of compression surface 106 shown includes isentropic compression surface 106b positioned between conical compression surfaces 106a and 106c, other configurations and combinations of one or more conical and/or isentropic compressions surface(s) can be used to slow the free stream air flow 108 to a Mach number less than or equal to 1 at the entrance to cowling 104.

An oblique shock 110 forms when the supersonic flow encounters leading edge 112 of compression surface 106a. A secondary compression wave 114 is shown at the transition between conical compression surface 106a and isentropic compression surface 106b. Another secondary wave 116 is shown at the transition between isentropic compression surface 106b and conic compression surface 106c. A series of small waves (not shown) typically occur along the curved surface of isentropic compression surface 106b. The isentropic compression theoretically occurs with no change in entropy.

Leading edge or lip 118 of cowling 104 is configured adjacent to the second conical compression surface 106c and is separated from the second conical compression surface 106c to form a cowling throat through which the air flows to the engine 102. A terminal shock 120 will form in the region of the cowling throat in a location that depends on the inlet/engine flow requirements. Formation of the terminal shock 120 is not dependent on a straight, conical, or isentropic compression but is rather a function of the amount of compression ahead of the shock 120, i.e., the Mach number to the shock.

A cowl shock 124 is shown extending upward off the leading edge 118 of cowling 104. While a traditional inlet employing an isentropic compression surface can have theoretically better pressure recovery than an inlet employing a straight-surface designed to the same operating conditions, real viscous effects combine to reduce the overall performance of traditional isentropic inlets that produce a strong normal shock at the cowling throat, which generally leads to poorer health of boundary layer 126 when compared to their equivalent straight or conic-surface counterparts. In the embodiments of inlet 100 disclosed herein, the air flow does not experience a strong normal shock at the cowling throat 120 so that the boundary layer 126 of the air flow along the surface of the inlet spike 105 remains undisturbed flowing through diffuser section 128 to the engine 102. The term boundary layer refers to a layer of reduced velocity in the air flow that is immediately adjacent to the surface of a solid past which the air is flowing.

The diffuser section 128 is configured downstream of the leading edge 118 of the cowling 104. Spatial separation between the surface 130 of spike 105 and surface 132 of cowling 104 increases toward the engine 102, thus further decreasing the speed of the air flow to meet air flow requirements of the engine 102.

In conventional systems, Mach numbers before the terminal shock at the leading edge 118 of cowling 104 are supersonic (i.e., Mach numbers greater than 1). The strength of the terminal shock at higher speeds distorts the boundary layer 126, resulting in low engine performance. Bleed air systems are typically included in conventional systems to strengthen and smooth the boundary layer. Embodiments of inlet 100 do not require bleed air components because the air flow entering the cowling 104 is not distorted by a strong terminal shock.

Figure 2:
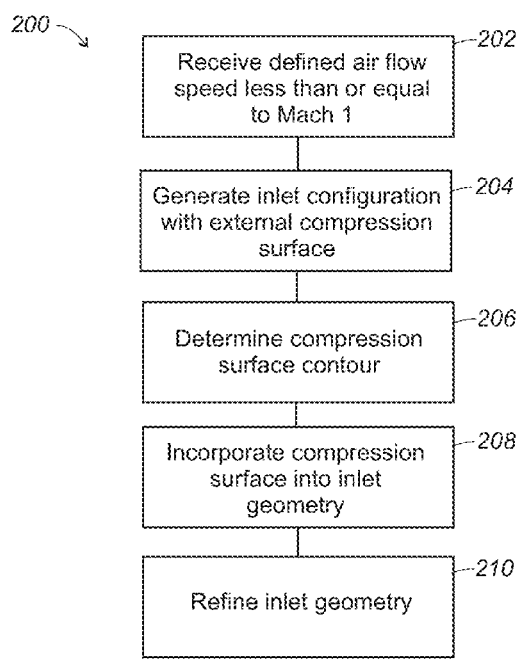
FIG. 2 shows a flow diagram of an embodiment of a method for designing an inlet in a propulsion system in accordance with the present invention.

Referring to FIG. 2, a flow diagram of an embodiment of a method 200 for designing an inlet in a propulsion system is shown. The propulsion system typically includes the inlet, an engine, and a cowling around at least a portion of the engine, such as described herein for FIGS. 1, 3, and 4.

The traditional supersonic inlet design process begins with the selection of compression surface geometry that best meets the performance and integration requirements of the intended application, for example aircraft design speed and/or terminal shock Mach number. For an external compression inlet, a compression surface configuration typically focuses the inlet-generated shocks, at supersonic design cruise speed, at a location immediately forward of the cowling highlight or cowling lip. The Mach number after the terminal shock is subsonic. In contrast, process 202 includes receiving a data value representing a defined air flow speed at the leading edge of a cowling that is less than or equal to ("$\leq$") Mach 1. The data can be input by an operator via an interactive computer workstation, read by computer logic instructions from a computer data file, included in logic instructions executed by a computer on which process 200 is implemented, or other suitable method. Setting the air flow speed to be equal to Mach 1 before the air flow enters diffuser section in the propulsion system contrasts to previously known propulsion systems where the Mach number of the flow is usually 1.3 or 1.4 before the normal shock. Compressing the air flow to a subsonic speed external to the cowling eliminates or greatly reduces the normal shock that disrupts the boundary layer and distorts the air flow to the engine. With the normal shock weakened to such an extent, the pressure rise is removed from the boundary layer, resulting in an inlet with less boundary layer distortion than conventional propulsion systems (before the bleed air system in conventional systems strengthens the boundary layer).

Process 204 can include generating a computational configuration for the inlet that slows supersonic air flow to the air flow speed defined at the leading edge of the cowl in process 202. In some embodiments, an electronic computer system executing logic instructions to perform process 200 can include logic instructions that implement an analysis technique known in the art as the Method of Characteristics (MOC) to generate a computational configuration for the inlet. The MOC generates an inviscid flow solution, where the solution does not account for viscosity of the fluid. The basic computational techniques that define the underlying MOC process are generally known to those skilled in the art and are available in the public domain. Compared to viscous results from higher order tools, such as Computational Fluid Dynamics (CFD), inviscid solutions can be obtained rapidly and without the need for extensive computational resources. Inviscid solutions usually possess a level of fidelity adequate for performing initial parametric surveys and to define the design space. However, other suitable techniques such as CFD analysis, and even manual calculations, could be used as an analytical tool in addition to or instead of the MOC. An example of a suitable commercially available program is CFD++ by Metacomp Technologies, Inc. in Agoura Hills, Calif.

A MOC program may be configured to operate in a design mode option in which the characteristics of a compression surface, for example, local free stream Mach number, terminal shock Mach number, surface angles, and shock-off-lip margin, can be input. The MOC program may then be configured to generate the compression surface geometry and cowl lip coordinates required to meet the prescribed boundary conditions. Once a surface has been defined, the geometry definition may then be employed within the MOC logic instructions in a direct analysis mode, in which the prescribed geometry may be evaluated at off-design conditions or in combination with defining the geometry of the cowling outer wall.

The MOC code is typically capable of configuring both two-dimensional and axisymmetric inlet arrangements using single straight-surface, multi-straight-surface, and/or isentropic compression surfaces. User-defined surface Mach number distributions may also be input as boundary conditions to define a custom compression surface. Note that normal shock Mach number cannot be specified for straight inlet compression surface arrangements, as the terminal Mach number is a result of a given configuration. However, for isentropic compression surfaces, terminal Mach number is defined (as in process 202) to provide MOC with an objective target for the completion of the isentropic flow turning process along the compression surface.

The MOC or other suitable technique for determining a computational configuration of a compression surface contour that meets that target terminal Mach number for the inlet can be used in process 206. The shape of a higher compression surface can be defined by integrating a differential equation written to describe the characteristics of a typical compression surface. The resulting integrated equation can then be extrapolated to compress the flow fully to Mach 1 or less. The configuration of the leading edge of the cowling adjacent to the compression surface can also be determined. The cowling is spacially separate from the compression surface to form a cowling throat through which the air flows to the engine.

Process 208 can include incorporating the compression surface contour in the inlet. The resulting inlet configuration can be analyzed using MOC, CFD or other suitable technique to determine whether the target Mach number and other desired flow characteristics are achieved before the flow enters the diffuser section.

Process 210 can include refining the inlet geometry (including the compression surface) until the desired terminal Mach number and other flow characteristics are achieved.

In computing the performance of the inlet configuration, the analysis technique used in process 200 can determine the effect of an oblique shock at supersonic speed at the leading edge of the compression surface including the change in speed and pressure of the airflow. The analysis also typically determines the change in pressure and amount of speed lost by the air flow over each section of the compression surface, such as the conical surface 106a, isentropic compression surface 106b, and conic compression surface 106c in FIG. 1. CFD analysis can also determine the speed of the airflow from the subsonic speed at the cowling throat to a slower subsonic speed in a diffuser section downstream of the leading edge of the cowling. The air flow does not experience a normal shock (or, alternatively, a normal shock that is much weaker than conventional inlets) along the inlet so that the boundary layer of the air flow in the diffuser section remains undisturbed.

Figure 3:
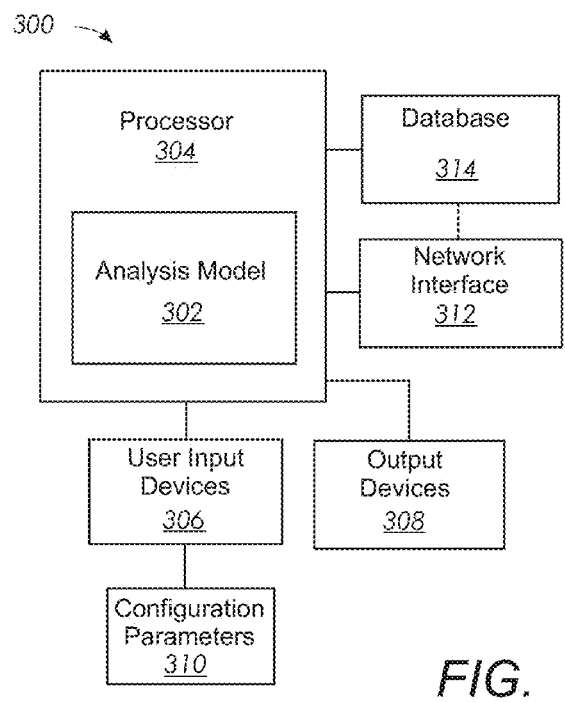
FIG. 3 shows a block diagram of an embodiment of a computerized design system that can be used to design an aircraft and propulsion system of FIG. 1.

Referring now to FIGS. 2 and 3, FIG. 3 shows a diagram of an embodiment of an interactive aircraft design system 300 that allows the user to design and analyze an inlet for an aircraft propulsion system in accordance with embodiments of the invention. Aircraft design system 300 includes logic instructions such as analysis model 302 that implement at least some of processes 202 through 210.

Logic instructions for analysis model 302 are executed in computer processor 304. Note that in other embodiments, additional sets of instructions can be performed by computer processor 304 in addition to, or instead of, analysis model 302 shown in FIG. 3.

User input devices 306 receive input from users and provide the input to processor 302. For example, information regarding the design of the inlet can be entered for analysis, for example, local free-stream Mach number, terminal shock Mach number, surface angles of the compression surface(s), and shock-off-cowling lip margin, can be input. Analysis model 302 may generate the compression surface geometry and cowl lip coordinates required to meet the prescribed boundary conditions. Once a surface has been defined, the geometry definition may then be employed within analysis model 302 in a direct analysis mode, in which the prescribed geometry may be evaluated at off-design conditions or in combination with defining the geometry of the cowling outer wall. If the desired inlet performance has not been met, changes in the configuration and/or design conditions can be made automatically or entered manually by the user.

The logic instructions can be implemented as software programs and distributed over an information network or suitable computer-readable media as a software application program that can be installed on a personal computer, a centralized server, or other suitable electronic computer system. The logic instructions can also be implemented in hardware, firmware, and/or a combination of hardware, firmware and software. User input devices 306 can include a keyboard, mouse, light pen, and/or a component such as a disk drive that can read data input files from a disk, to enable a designer to enter suitable constraints and design parameters. One or more output devices 308 such as a display device, printer, plotter, or other suitable output device can be coupled to receive information from processor 304. A user interface can also be included that provides instructions for using system 300, possible configuration parameters 310, as well as assistance in interpreting the results. The results can be formatted and output for use in other design systems, such as computer-aided design and drawing systems via network interface 312, to easily share the results of the design effort. Processor 304 can be configured to access a database 314 either directly or via network interface 312 for mass data storage and retrieval.

Examples of software packages that are suitable for use in portions of design system 300 and commercially available include CFD++ by Metacomp Technologies, Inc. in Agoura Hills, California. Other suitable software programs can be utilized.

Figure 4:
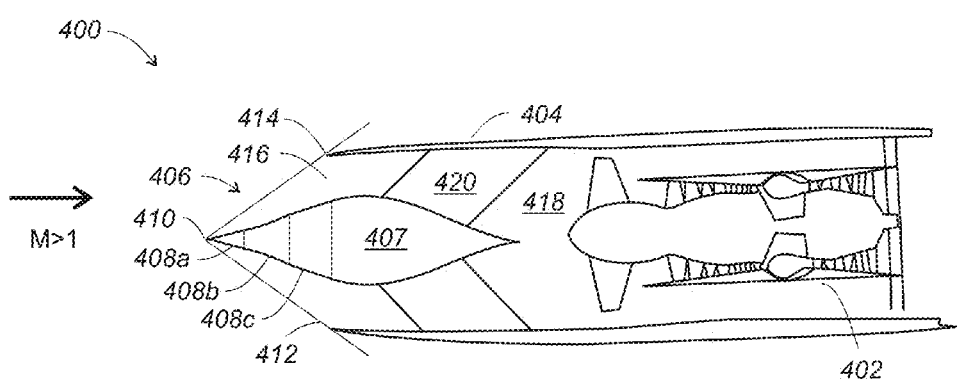
FIG. 4 shows a side cross-sectional view of an aircraft propulsion system in accordance with the present invention.

Referring to FIG. 4, a side cross-sectional view of an embodiment of a propulsion system 400 is shown including an engine 402, a cowling 404 surrounding at least a portion of the engine 402, and an inlet 406 with inlet spike 407. The inlet 406 includes one or more compression surfaces 408a, 408b, 408c (collectively, "408") upstream and external to the cowling 404. The compression surface 408 is configured to slow air flow from supersonic speed to subsonic speed before the air flow enters the cowling 404. A leading edge 410 of the compression surface 408 generates an oblique shock 412 when the air flow is at supersonic speed.

In some embodiments, compression surface 408 includes a first conical compression surface 408a and isentropic compression surface 408b. The first conical compression surface 408a is configured between the leading edge 410 and the isentropic compression surface 408b. A second conical compression surface 408c can be configured adjacent to and downstream of the isentropic compression surface 408b.

A leading edge 414 of the cowling 404 is configured adjacent to the second conical compression surface 408c and is separated from the second conical compression surface 408c to form a cowling throat 416 through which the air flows to the engine 402. The inlet 406 an inlet spike 407 held by three spike struts 420.

The propulsion system 400 further includes a diffuser section 418 downstream of the leading edge 414 of the cowling 404. The air flow does not experience a normal shock along the inlet 416 so that a boundary layer of the air flow in the diffuser section remains undisturbed. As a result of the smooth air flow due to the configuration of inlet 406, the propulsion system 400 does not require bleed air components to smooth the air flow after a normal shock that would occur in previous inlet designs.

In some embodiments, an inlet/engine configuration is based on a General Electric (GE) supersonic aircraft engine that maintains a status range of 3600 nautical miles at Mach 1.8. The fixed compression geometry engine inlet is optimized for Mach 1.8. A maximum Mach 1.8 capable design represents performance of the Mach 1.8 designed engine cruising at Mach 1.6. A Mach 1.8 capable engine flying at Mach 1.6 increases range and engine life, and potentially improves performance on hot-temperature days. For General Electric, Rolls-Royce, and Pratt & Whitney engines designed with fixed compression geometry external compression inlets optimized for Mach 1.8 cruise, maximum range occurs at Mach 1.6 due to an optimal wing/engine match at Mach 1.6.

In an alternative embodiment, an engine is configured with a fixed compression geometry inlet optimized for Mach 1.6, increasing range to approximately 4250 nautical miles due to a lift/drag ratio increased by a full percentage point, and a lower engine weight enabling more fuel to burn in cruise. Other engines can be utilized.

Figure 5A:
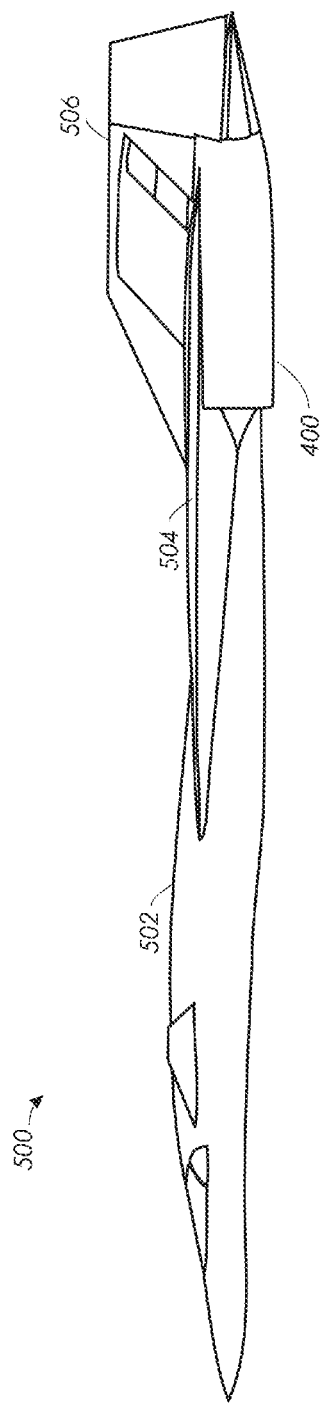
FIGS. 5A and 5B show respective side and front views of an embodiment of a supersonic aircraft in which the propulsion system of FIG. 4 can be used.
Figure 5B:
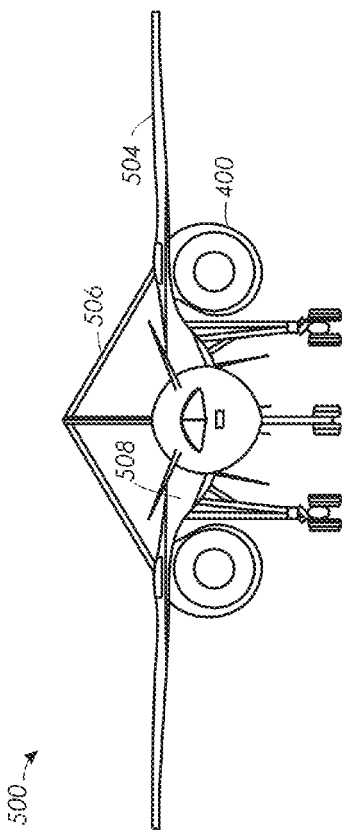

Referring to FIGS. 4, 5A, and 5B, a side and front view of an embodiment of a supersonic aircraft 500 is shown in which at least one of propulsion system 400 (FIG. 4) can be used. Aircraft 500 includes an airframe 502 with wings 504, and a propulsion system 400 is installed under the aircraft wing 502 and partially supported by an inverted V-tail 506 coupled to wings 504. Engine 402 is 33,000-lbf thrust class, non-augmented or dry, with medium bypass, and Full Authority Digital Engine Control (FADEC) control or other suitable engine.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed:

1. A propulsion system comprising:
    an engine having an engine casing and a center body that extends upstream of a leading edge of the engine casing;
    a cowling surrounding at least a portion of the engine; and
    an inlet comprising an inlet spike, the inlet spike including:
        at least one compression surface upstream and external to the cowling, the at least one compression surface has a leading edge and is configured to slow air flow from supersonic speed to subsonic speed before the air flow enters the cowling, and
        a terminating edge of the inlet spike surrounded by the cowling and upstream of a leading edge of the center body.

2. The propulsion system according to claim 1 further comprising:
    the leading edge of the at least one compression surface configured to generate an oblique shock at supersonic speed.

3. The propulsion system according to claim 2 further comprising:
    the at least one compression surface includes a first conical compression surface and isentropic compression surface, the first conical compression surface is configured between the leading edge and the isentropic compression surface.

4. The propulsion system according to claim 3 further comprising:
    a second conical compression surface configured adjacent to and downstream of the isentropic compression surface.

5. The propulsion system according to claim 4 further comprising:
    a leading edge of the cowling is configured adjacent to the second conical compression surface and is separated from the second conical compression surface to form a cowling throat through which the air flows to the engine.

6. The propulsion system according to claim 1, further comprising:
    a diffuser section downstream of the leading edge of the cowling, wherein the air flow does not experience a normal shock along the inlet so that a boundary layer of the air flow in the diffuser section remains undisturbed.

7. The propulsion system according to claim 1, wherein the system does not include bleed air components to smooth the air flow after a normal shock at the inlet.

8. The propulsion system according to claim 1, further comprising a strut extending in a downstream direction from the at least one compression surface to the cowling.

9. The propulsion system according to claim 8, wherein the strut is in contact with the cowling on one end and the at least one compression surface on another end.

10. A supersonic aircraft comprising:
    an airframe;
    a propulsion system integrated with the airframe, wherein the propulsion system includes an engine having an engine casing and a center body that extends upstream of a leading edge of the engine casing; and
    an inlet to the propulsion system including
        an inlet cowling and
        an inlet spike that includes:
            a compression surface contoured external to the inlet cowling to slow supersonic air flow to a speed less than or equal to the speed of sound (Mach Number<1) external to the inlet cowling, the compression surface having a leading edge, and
            a terminating edge of the inlet spike surrounded by the inlet cowling and upstream of a leading edge of the center body.

11. The aircraft according to claim 10 further comprising:
    the leading edge of the at least one compression surface generates an oblique shock at supersonic speed.

12. The aircraft according to claim 10, wherein the compression surface further comprises:
    a first conical compression surface at the leading edge;
    an isentropic compression surface adjacent to and downstream of the first conical compression surface.

13. The aircraft according to claim 12, wherein the compression surface further comprises:
    a second conical compression surface configured adjacent to and downstream of the isentropic compression surface.

14. The aircraft according to claim 13 wherein:
    the cowling is spatially separated from the inlet spike to form a cowling throat and a diffuser section through which the air flows to the engine.

15. The aircraft according to claim 14, further comprising:
    the diffuser section is downstream of the leading edge of the cowling, wherein the air flow does not experience a normal shock along the inlet that would disrupt a boundary layer of the air flow in the diffuser section.

16. The aircraft according to claim 10, further comprising a strut extending in a downstream direction from the compression surface to the inlet cowling.

17. The aircraft according to claim 16, wherein the strut is in contact with the inlet cowling on one end and the compression surface on another end.

* * * * *